(12) United States Patent
Okajima et al.

(10) Patent No.: US 7,514,654 B2
(45) Date of Patent: Apr. 7, 2009

(54) GLASS ARTICLE WITH METAL MEMBER JOINED THERETO, AND JUNCTION STRUCTURE USING THE SAME

(75) Inventors: Ichiro Okajima, Tokyo (JP); Hideki Watanabe, Tokyo (JP); Kazuo Yamada, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 1017 days.

(21) Appl. No.: 10/506,385

(22) PCT Filed: Mar. 11, 2003

(86) PCT No.: PCT/JP03/02825

§ 371 (c)(1),
(2), (4) Date: Sep. 2, 2004

(87) PCT Pub. No.: WO03/076239

PCT Pub. Date: Sep. 18, 2003

(65) Prior Publication Data

US 2005/0112291 A1    May 26, 2005

(30) Foreign Application Priority Data

Mar. 11, 2002  (JP) .............................. 2002-065321
Apr. 1, 2002  (JP) .............................. 2002-098795

(51) Int. Cl.
*H05B 3/06* (2006.01)
*B05D 1/02* (2006.01)
(52) U.S. Cl. ....................... 219/522; 219/202; 219/203; 219/541; 219/542; 219/543; 427/447
(58) Field of Classification Search ............. 219/202–3, 219/522, 541–3; 427/447
See application file for complete search history.

(56) References Cited

U.S. PATENT DOCUMENTS 4,246,467 A    1/1981    Boaz et al.

(Continued)

FOREIGN PATENT DOCUMENTS

EP    0477069    3/1992

(Continued)

*Primary Examiner*—Shawntina Fuqua
(74) *Attorney, Agent, or Firm*—Hamre, Schumann, Mueller & Larson, P.C.

(57) ABSTRACT

The present invention is intended to provide a glass article with a metal member joined thereto in which an electroconductive coating film is formed on at least a part of the surface of the glass article by baking a silver paste that includes Ag particles and a glass frit, a joining plane of the metal member is fixed onto the electroconductive coating film with a lead-free solder alloy containing Sn as a main component, and the lead-free solder alloy contains at least 1.5 mass % of Ag, which prevents the appearance of the electroconductive coating film and the bonding strength from degrading. Furthermore, in the present invention, when using a metal member having at least two joining planes, the total area of the joining planes is set within a range of 37 $mm^2$ to 50 $mm^2$, which allows high bonding strength between the glass article and metal member to be maintained while using the lead-free solder alloy. Moreover, in the present invention, the volume of the lead-free solder alloy to be provided on each joining plane is set to be 1.0 to 2.0 times the product of the area of the joining plane concerned and the thickness of the lead-free solder alloy, which prevents cracks from occurring in the glass article.

4 Claims, 3 Drawing Sheets

U.S. PATENT DOCUMENTS

| | | |
|---|---|---|
| 5,738,554 A | 4/1998 | Borger et al. |
| 5,985,212 A | 11/1999 | Hwang et al. |

FOREIGN PATENT DOCUMENTS

| | | | |
|---|---|---|---|
| EP | 0488878 | | 6/1992 |
| EP | 0974558 | | 1/2000 |
| JP | 57-041763 | * | 9/1982 |
| JP | 57-41763 | | 9/1982 |
| JP | 61-37182 | * | 10/1986 |
| JP | 6-58557 | | 8/1994 |
| JP | 6-058557 | * | 8/1994 |
| JP | 10-314980 | | 3/1999 |
| JP | 2000-141078 | | 10/2000 |
| JP | 2002-1581 | | 1/2002 |
| JP | 2002-001581 | * | 1/2002 |
| JP | 2002-11593 | | 1/2002 |
| JP | 2002-011593 | * | 1/2002 |

* cited by examiner

GLASS ARTICLE WITH METAL MEMBER JOINED THERETO, AND JUNCTION STRUCTURE USING THE SAME

TECHNICAL FIELD

The present invention relates to a glass article with a metal member joined thereto, and a structure of joining a glass article and a metal member together. Particularly, the present invention relates to an adequate junction made between a glass article and a metal member using a lead-free solder alloy.

BACKGROUND ART

In order to ensure the driver's view, electroconductive lines (heating wires) are formed as a defogger on the surface of a glass sheet to be used for a rear window of a car in some cases. The defogger is supplied with an electric current through a feeding metal terminal. This metal terminal is provided on a bus bar connected to the defogger. In some cases, a glass antenna may be used for the rear and side windows of a car. In the case of using the glass antenna, electroconductive lines are formed, on the surface of a glass sheet, in a pattern (an antenna pattern) corresponding to the wavelength to be received. A metal terminal also is provided for the feeding point of this antenna pattern.

Generally, the electroconductive line and bus bar are formed by baking a silver (Ag) paste printed onto the surface of the glass sheet. The Ag paste normally contains Ag particles, a glass frit, and a solvent. A metal terminal is fixed onto the electroconductive coating film formed by baking this Ag paste. Conventionally, a metal terminal is soldered using a tin-lead (Sn—Pb-based) solder alloy. Recently, from the viewpoint of environmental protection, it has been demanded to use a lead-free solder in producing car window glass.

However, when a metal terminal is joined to a glass sheet using a lead-free solder alloy, particularly, a Sn-based lead-free alloy, the following problems occur.

First, the electroconductive coating film may melt and flow into the soldered junction, which may impair the appearance of the electroconductive coating film. The bond strength also degrades together with the degradation in appearance.

Second, it tends to be more difficult to ensure the bond strength of the metal terminal as compared to the case of using the Sn—Pb-based alloy. This tendency becomes conspicuous when using a metal terminal having a plurality of joining planes.

Third, cracks may occur at the surface of the glass sheet in the vicinity of the soldered junction due to a rapid temperature change. Even if the cracks caused in the glass sheet are minute, they should be avoided when consideration is given to the long term strength of the glass sheet. This phenomenon also becomes conspicuous when using a metal terminal having a plurality of joining planes.

In conjunction with the second problem, for example, JP-U-61(1986)-37182 discloses that the bond strength increased with an increase in soldered joining area.

DISCLOSURE OF THE INVENTION

The first problems can be solved by an addition of Ag to a Sn-based lead-free solder alloy. The addition of Ag improves not only the appearance but also the bond strength. From a first aspect, the present invention provides a glass article with a metal member joined thereto in which an electroconductive coating film is formed on at least a part of the surface of the glass article by baking a silver paste that includes Ag particles and a glass frit. A joining plane of the metal member is fixed onto the electroconductive coating film with a lead-free solder alloy containing Sn as a main component, and the lead-free solder alloy contains at least 1.5 mass % of Ag, for example, 1.5 to 5 mass % of Ag.

In order to solve the second problem, a metal terminal was used that had an enlarged joining plane, but thereby the bond strength rather decreased. Surprisingly, the bond strength was improved by using a metal terminal with a smaller joining plane than conventional one. From the second aspect, the present invention provides a glass article with a metal member joined thereto in which an electroconductive coating film containing Ag is formed on at least a part of the surface of the glass article. At least two joining planes of the metal member are fixed onto the electroconductive coating film with a lead-free solder alloy containing Sn as a main component, and a total area of the at least two joining planes is in the range of 37 $mm^2$ to 50 $mm^2$.

The third problem can be relieved not by the increase but the decrease in amount of the solder to be used. When the solder was prevented from spreading outside the joining plane, less cracks occurred in the glass sheet. From the third aspect, the present invention provides a glass article with a metal member joined thereto in which an electroconductive coating film containing Ag is formed on at least a part of the surface of the glass article, at least two joining planes of the metal member are fixed onto the electroconductive coating film with a lead-free solder alloy containing Sn as a main component, and with respect to each of the at least two joining planes, a volume of the lead-free solder alloy is 1.0 to 2.0 times the product of the area of the joining plane concerned and the thickness of the lead-free solder alloy.

In the present specification, the "main component" denotes a component that accounts for at least 50 mass % according to its common use.

BEST MODE FOR CARRYING OUT THE INVENTION

Figure 1:
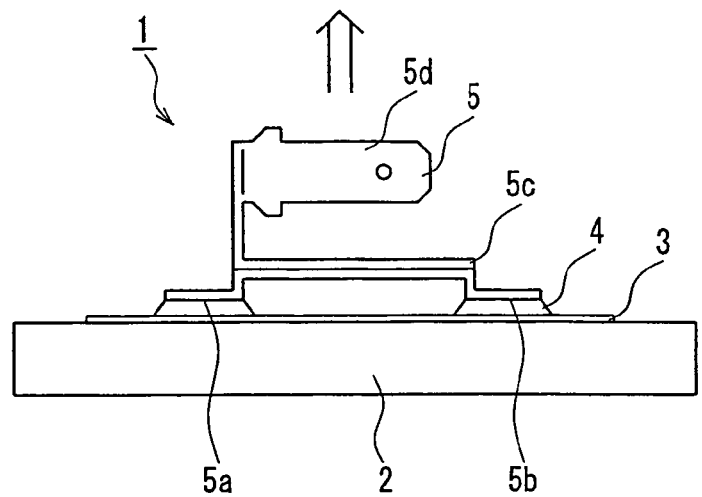
FIG. 1 is a sectional view showing an example of a glass article according to the present invention.

Since the Sn-based lead-free alloy lacks flexibility as compared to the Sn—Pb-based alloy, the junction soldered using this lead-free alloy is inferior in the stress relaxation characteristic. Particularly, when there are a plurality of joining planes, thermal stress is developed in the in-plane direction in the glass sheet by the temperature change caused by soldering due to the difference in thermal expansion coefficient between glass and the portion of a metal member that connects the joining planes to each other. Accordingly, the strength of the glass sheet decreases, and in some cases, cracks may occur at the surface of the glass that is a brittle material. Actually, it was confirmed by a tension test of a metal member (a metal terminal) that the terminal and the glass sheet were ruptured due to the breakage not of the junction soldered using the Sn-based lead-free alloy but rather the inner portion of the glass in the vicinity of the soldered junction.

Thus, it is considered that the thermal stress has some part in both the decrease in bond strength and the occurrence of cracks. The former can be prevented by controlling the joining area within a predetermined range, and the latter can be prevented by controlling the amount of the solder to be used to a degree that does not allow the bond strength to decrease considerably. Specifically, it is preferable that the joining area is controlled within the range of 37 mm$^2$ to 50 mm$^2$, particularly 40 mm$^2$ to 45 mm$^2$. In order to prevent the solder from considerably spreading outside the joining plane, it is preferable to control the volume V of the solder alloy to be 1.0 to 2.0 times the product of the area S of the joining plane and the thickness T of the lead-free solder alloy. In other words, it is preferable to control the volume V so that the following relative equation holds:

$$1.0ST \leq V \leq 2.0ST$$

When the Sn-based lead-free solder alloy containing no Ag is used on an electroconductive coating film containing Ag that has been formed by baking a Ag paste, Sn contained in the solder alloy and Ag contained in the electroconductive coating film form a compound. As a result, the electroconductive coating film is corroded. In order to prevent the appearance of the glass article from degrading due to this corrosion, a Sn—Ag lead-free alloy may be used that contains at least 1.5 mass % of Ag.

Another advantage in adding Ag is that the bond strength increases. The strength of the junction soldered using the Sn—Ag alloy increases with an increase in rate of Ag content, but becomes almost constant when the rate of Ag content exceeds about 2 wt. %.

On the other hand, an excessively high rate of Ag content causes a considerable rise in material cost and also raises the liquidus temperature of the alloy. The increase in liquidus temperature causes an increase in soldering temperature. Hence, the thermal stress increases and thereby the workability in soldering also deteriorates. When consideration is given to this, it is preferable that the rate of Ag content in the Sn—Ag solder alloy is 5 mass % or less, further preferably 4 mass % or less.

With respect to the Sn—Ag alloy, when it has an eutectic composition of Sn-3.5Ag (an alloy made of 3.5 mass % of Ag and Sn that accounts for the rest), it has the lowest liquidus temperature (221° C.). In this case, the tip of the soldering iron has a temperature of 310° C. to 320° C. A low temperature of the tip has an effect of relieving of thermal stress caused by the difference in thermal expansion coefficient between members to be joined together. In the Sn-3.5Ag alloy, all the Ag is present as an intermetallic compound of $Ag_3Sn$. In the Sn-3.5Ag alloy, the precipitating grains do not become large as compared to the Sn—Pb alloy. This is because Ag atoms do not disperse easily in the solid phase Sn.

As described above, a preferable rate of Ag content in the Sn—Ag alloy is 1.5 to 5 mass %, further preferably 2 to 4 mass %, and particularly 2 to 3 mass %. This Sn-based lead-free solder alloy having this rate of Ag content is particularly suitable for the purpose of joining a metal member onto the electroconductive coating film formed by baking an Ag paste onto the surface of a glass article. This alloy composition brings preferable results regardless of whether the number of the joining plane is one or more. The Sn—Ag alloy may contain other minor components. In this case, it is preferable that the content of the minor components is 0.5 mass % or less.

The metal member having at least two joining planes is not particularly limited. For example, however, the metal member may be a metal terminal including a leg part having the at least two joining planes and a connection part that projects upward from the leg part and is to be connected to a cable. Through this metal terminal, electricity can be fed to the electroconductive coating film formed on the surface of the glass sheet.

The glass article also is not particularly limited, and for example, a glass sheet may be used that is formed of a soda-lime silica composition, as in the conventional case. When it is used for car window glass, the glass sheet suitably is subjected to tempering, bending, or the like.

The electroconductive coating film may be at least one selected from an antenna and a defogger. The electroconductive coating film may be formed by printing and baking a silver paste in a predetermined pattern that is suitable for functioning as an antenna and/or a defogger. For the silver paste, a composition may be used that includes silver particles, a glass frit, and a solvent, as is conventionally used for glass articles. Its composition is not particularly limited, but as an example, it contains 70 to 85 mass % of silver particles, 1 to 20 mass % of a glass frit, and 5 to 25 mass % of a solvent.

Hereinafter, embodiments of the present invention are described with reference to the drawings.

In a glass article 1 shown in FIG. 1, an electroconductive coating film 3 is formed in a predetermined pattern on the surface of a glass sheet 2. A metal terminal 5 is joined onto the electroconductive coating film 3 with a lead-free solder alloy 4. This terminal 5 has two joining planes 5a and 5b, a leg part 5c for bridging these joining planes, and a connection part 5d that projects upward from the leg part.

In FIG. 1, the lead-free solder alloy 4 spreads slightly toward the electroconductive coating film 3. The solder alloy 4, however, does not spread out considerably from the joining planes 5a and 5b but substantially stays between the coating film 3 and the joining planes 5a and 5b. In order to diminish the spread of the solder alloy 4, for example, the amount of the solder alloy 4, which is supplied in a state of being applied onto the joining planes 5a and 5b of the terminal, may be limited within an adequate range.

Figure 2A:
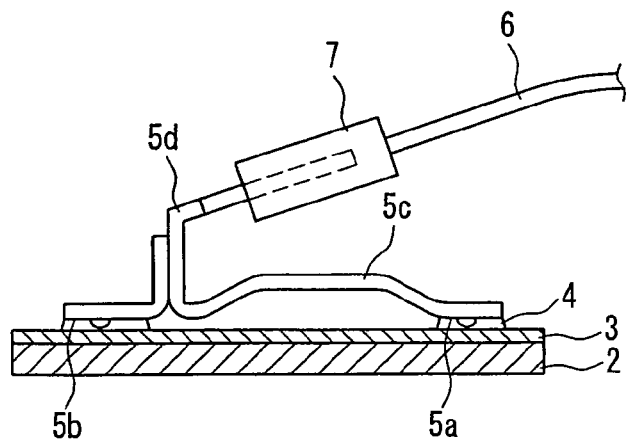
FIG. 2A is a sectional view showing another example of a glass article according to the present invention.

FIG. 1 shows the terminal 5 formed with a metal portion that forms the connection part 5d being disposed above a metal portion that forms the leg part 5c. The shape of the terminal, however, is not limited thereto. For instance, as shown in FIG. 2A, a terminal 5 may be employed in which a metal portion that forms parts of the connection part 5d and the leg part 5c is combined with a metal portion that forms the rest of the connection part 5d and the leg part 5c. Such a terminal can be formed with one metal plate being bent.

To the connection part 5d of this terminal 5 is connected a wire 6 having a connector 7 on its end. Through this wire, the electroconductive coating film 3 is connected electrically to a power source, an amplifier, etc., which are omitted in the drawing. As described above, the glass article according to the present invention is suitable for a junction structure in which a cable is connected to the connection part of the metal fitting and this cable and the electroconductive coating film are electrically connected to each other, that is, a structure for supplying electricity to the electroconductive coating film provided on the glass surface.

Figure 2B:
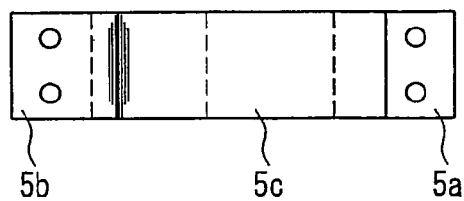
FIG. 2B shows a metal terminal of the glass article seen from its back side.
Figure 2C:
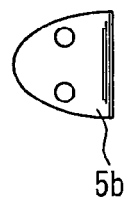
FIG. 2C is a plan view showing an example of a joining plane with another shape of the metal terminal.

The shape of the joining planes of the metal terminal is not limited to a rectangle (FIG. 2B) but may be a circle, an ellipse, a semicircle (FIG. 2C), a triangle, a polygon with five vertices or more, or the like.

Figure 3:
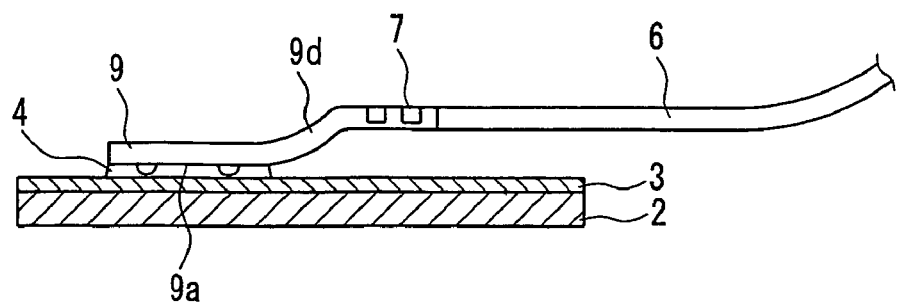
FIG. 3 is a sectional view showing still another example of a glass article according to the present invention.

As described above, the Sn—Ag alloy of the present invention also can be used for the junction structure with only one joining plane. In this case, for example, a planar terminal 9 can be used that has one joining plane 9a and a connection part 9d as shown in FIG. 3.

EXAMPLES

Example 1

The same junction structures as that shown in FIG. 1 were produced. In each of them, soda-lime silica glass having a thickness of 3.1 mm was used for the glass sheet 2, a Sn—Ag alloy whose Ag content is shown in Table 1 was used as the lead-free solder alloy 4, and a terminal formed of a Cu metal sheet was used as the metal terminal 5. The areas of the two joining planes of the metal terminal 5 are set to be equal (a ratio of 1:1) to each other and to sum up to 56 mm$^2$. The electroconductive coating film 3 was formed by screen-printing an Ag paste containing about 80 mass % of Ag particles, about 5 mass % of a glass frit, and about 15 mass % of an organic solvent, drying it, and further baking it at about 700° C.

The lead-free solder alloy was applied to the joining planes of the metal terminal beforehand. The soldering was carried out by applying a flux to the solder alloy, pressing the joining planes of the metal terminal onto the electroconductive coating film, and pressing a soldering iron (with its tip having a temperature of about 310° C.) against the terminal. After the completion of the process, it was left at room temperature for 24 hours.

With respect to each sample thus obtained, its bond strength was measured. The stress caused when the terminal was pulled upward (FIG. 1) and thereby the terminal and the glass sheet were ruptured, was employed to indicate the bond strength. In addition, the state of a portion of the electroconductive coating film located in the vicinity of the junction was checked visually. The appearance of each sample was evaluated by comparison with the case of using a Sn—Pb-based solder alloy. The results are shown in Table 1.

TABLE 1

| | Components (mass %) | | Melting Temperature (° C.) | Appearance | Bond Strength (N) |
|---|---|---|---|---|---|
| | Sn | Ag | | | |
| Sample 1A | The rest | 0.5 | 220-235 | D | 245 |
| Sample 1B | The rest | 1.0 | 220-234 | C | 333 |
| Sample 1C | The rest | 1.5 | 218-231 | B | 471 |
| Sample 1D | The rest | 2.0 | 219-229 | B | 529 |
| Sample 1E | The rest | 2.5 | 219-228 | B | 476 |
| Sample 1F | The rest | 3.0 | 220-225 | B | 515 |
| Sample 1G | The rest | 3.5 | 220-222 | B | 494 |
| Sample 1H | The rest | 4.0 | 220-228 | B | 478 |
| Sample 1I | The rest | 5.0 | 220-244 | B | 503 |
| Sample 1J | The rest | 6.0 | 220-257 | B | 457 |
| Sample 1K | The rest | 7.0 | 220-268 | B | 482 |

In each column of the melting temperature, the numbers on the left and right sides indicate a solidus temperature and a liquidus temperature, respectively. The appearance was evaluated with A standing for "superior", B "equivalent", C "slightly inferior", and D "considerably inferior".

In the test of the bond strength, rupture took place inside the glass in all the samples. In the electroconductive coating films of Samples 1A and 1B, which contain less than 1.5 wt. % of Ag, their appearances degraded due to the "silver corrosion phenomenon".

Figure 4:
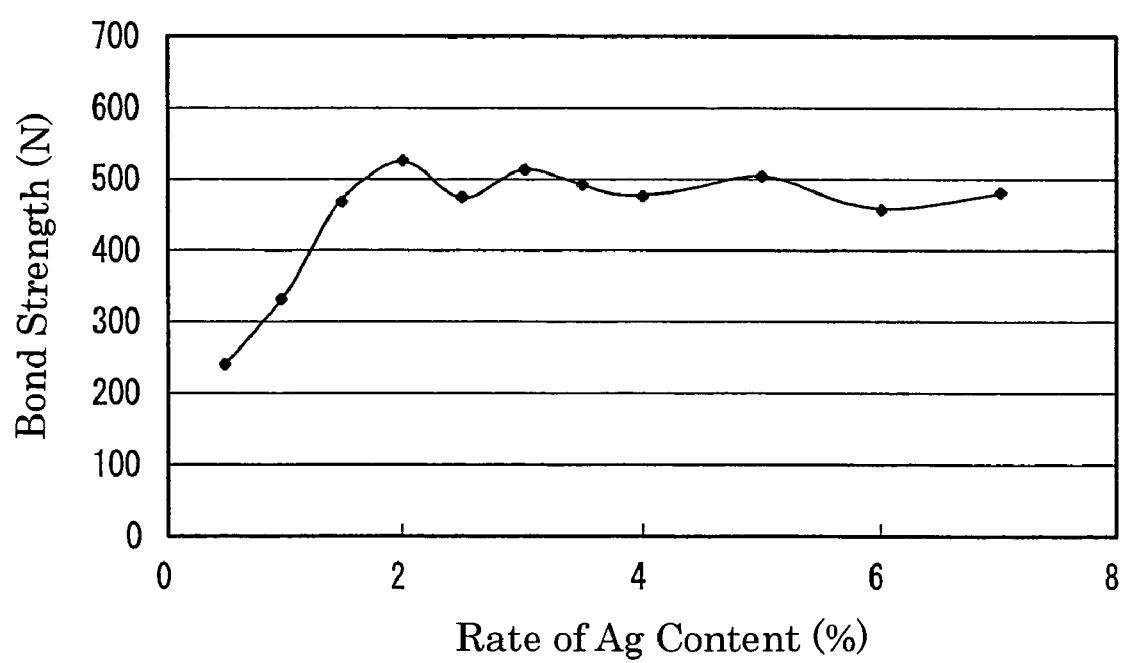
FIG. 4 is a graph showing measurement results obtained in Example 1.

The relationship between the rate of Ag content and bond strength is summarized and shown in FIG. 4. The bond strength increases until the rate of Ag content increases up to around 1.5 to 2 wt. % but becomes almost constant when it exceeds 2 wt. %.

Except for Samples 1J and 1K, which contain more than 5 wt. % of Ag, the solder alloys had a liquidus temperature of 250° C. or lower. In addition, the respective samples had a solidus temperature of 220° C. or slightly lower. The temperature characteristics (the liquidus temperature: 230° C. or lower, and the difference between the liquidus temperature and the solidus temperature: 10° C. or less) of the samples 1D to 1H are advantageous in reducing the thermal stress and shortening the cooling time after soldering.

Example 2

Samples were obtained in the same manner as in Example 1 except that a Sn—Ag alloy was used that contains 98 mass % of Sn and 2 mass % of Ag, and the total area of the joining planes was set at the values shown in Table 2.

With respect to each sample thus obtained, its bond strength was measured in the same manner as in Example 1. The results are shown in Table 2.

In all the samples, rupture of the junction took place not at the soldered junction but inside the glass.

TABLE 2

| Samples | Total Area of Joining Planes (mm$^2$) | Bond Strength (N) |
|---|---|---|
| 2A | 28 | 522.3 |
| 2B | 35 | 519.5 |
| 2C | 42 | 727.9 |
| 2D | 49 | 591.8 |
| 2E | 56 | 503.1 |

Figure 5:
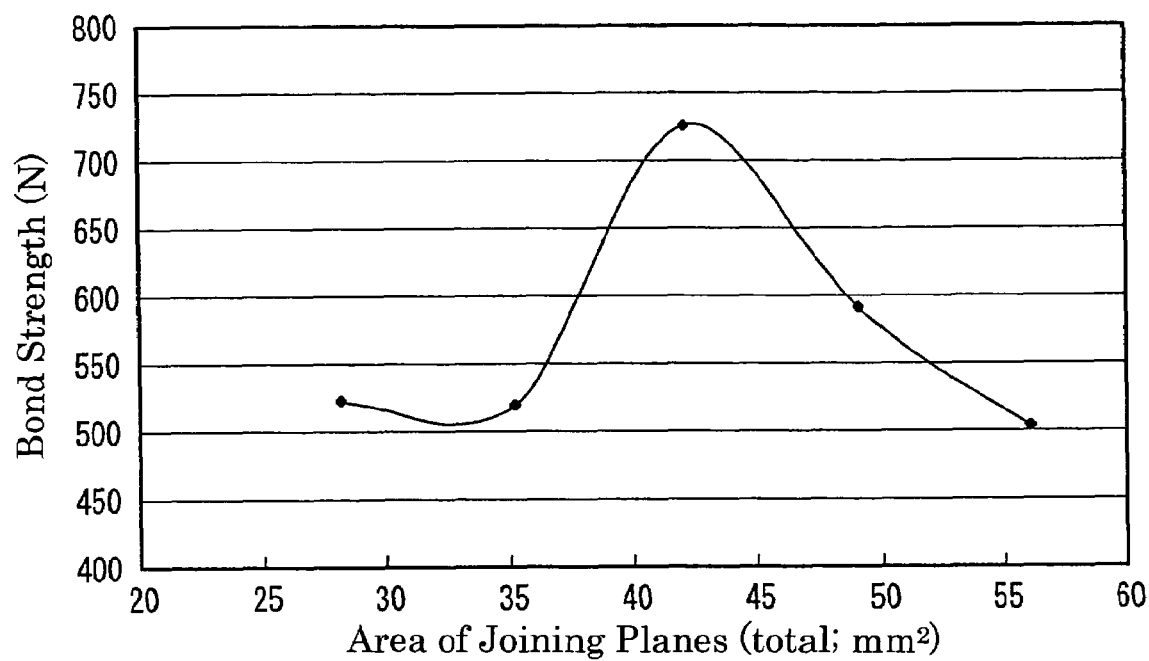
FIG. 5 is a graph showing measurement results obtained in Example 2.

As is apparent from FIG. 5 showing the relationship between the total area of joining planes (joining area) and the bond strength, the bond strength degrades both in the case where the joining area is too large and where it is too small. Thus, in order to improve the bond strength in the junction structure in which the terminal having a plurality of joining planes is fixed with a "hard" lead-free solder alloy, the joining area needs to be designed properly. This proper design also brings preferable results from the viewpoint of the reduction in amount of the solder to be used.

Example 3

Samples were obtained in the same manner as in Example 1 except that the amount of the lead-free solder alloy 4 provided on the respective joining planes and the total area of the joining planes were set at values shown in Table 3. With respect to each of n pieces of samples thus obtained, a thermal test was carried out through predetermined temperature cycling, and the state of the glass surface was checked visually every 100 cycles after 200 cycles. The temperature cycling was set to include a period of retention for 30 minutes at −30° C., a period of raising temperature to 80° C. in three minutes, a period of retention in this state for 30 minutes, and a period of decreasing temperature to −30° C. in three minutes, and thus the thermal cycle test was carried out. The results are shown in Table 3.

In Samples 3A to 3D and 3F to 3G, no cracks occurred in the glass even when the above-mentioned thermal cycle was repeated 500 times. In Sample 3A, the bond strength determined by the tension test carried out in the same manner as in Example 1, however, was lower than that of Sample 3C by about 25%. On the other hand, since Sample 3G had a reduced joining area, its bond strength was higher than that of Sample 3C by about 18%. The volumes shown in the table were calculated from the mass of the solder alloy and its specific gravity.

TABLE 3

| Samples | Solder Alloy | | | | V/ST | n | The number of cracks caused by thermal test | | | |
|---|---|---|---|---|---|---|---|---|---|---|
| | Amount (g) | Volume (mm³) | Joining Area | Thickness (mm) | | | 200 | 300 | 400 | 500 |
| 3A | 0.1 | 13.6 | Normal | 0.5 | 0.5 | 2 | 0 | 0 | 0 | 0 |
| 3B | 0.2 | 27.2 | Normal | 0.5 | 1.0 | 6 | 0 | 0 | 0 | 0 |
| 3C | 0.3 | 40.8 | Normal | 0.5 | 1.5 | 10 | 0 | 0 | 0 | 0 |
| 3D | 0.4 | 54.3 | Normal | 0.5 | 1.9 | 6 | 0 | 0 | 0 | 0 |
| 3E | 0.5 | 67.9 | Normal | 0.5 | 2.4 | 6 | 3 | 1 | 0 | 1 |
| 3F | 0.2 | 27.2 | Reduced | 0.5 | 1.3 | 6 | 0 | 0 | 0 | 0 |
| 3G | 0.3 | 40.8 | Reduced | 0.5 | 1.9 | 6 | 0 | 0 | 0 | 0 |
| 3H | 0.4 | 54.3 | Reduced | 0.5 | 2.6 | 6 | 0 | 0 | 2 | 1 |

"Normal" indicates 56 mm², and "Reduced" denotes 42 mm².

INDUSTRIAL APPLICABILITY

As described above, the present invention can provide a glass article including a junction with a metal member that is excellent in strength while using a lead-free solder alloy.

The invention claimed is:

1. A glass article with a metal member joined thereto, comprising:
    an electroconductive coating film formed on at least a part of a surface of the glass article by baking a silver paste that includes Ag particles and a glass frit,
    wherein the metal member comprises two joining planes, a leg part that bridges the two joining planes, and a connection part that projects unward from the leg part, and
    wherein the two joining planes of the metal member are fixed onto the electroconductive coating film with a lead-free solder alloy containing Sn as a main component, and
    wherein when the glass article undergoes a tension test in which the metal member is pulled upward, the glass article and the metal member are ruptured because of a breakage of an inner portion of the glass article in a vicinity of a junction portion soldered using the lead-free solder and not because of a breakage of the junction portion, and
    wherein the lead-free solder alloy is a Sn—Ag based alloy that contains 2 to 4 mass % of Ag, and a content of other minor components except for Sn and Ag in the Sn—Ag based alloy is 0.5 mass % or less, and
    wherein the Sn—Ag based alloy has a liguidus temperature of 230° C. or lower, and the difference of the liquidus temperature and a solidus temperature of the Sn—Ag based alloy is 10° C. or less, and
    wherein a total area of the two joining planes is in a range of 40 mm² to 45 mm².

2. The glass article according to claim 1, wherein the electroconductive coating film is at least one selected from an antenna and a defogger.

3. The glass article according to claim 1, wherein with respect to each of the two joining planes, a volume of the lead-free solder alloy is 1.0 to 2.0 times the product of an area of the joining plane concerned and a thickness of the lead-free solder alloy, and
    wherein the alass article forms no cracks after 500 times of a thermal cycle, and each thennal cycle consists of a first period of retention for 30 minutes at −30° C. a second period of raisina tenperature to 80° C. in three minutes, a third period of retention for 30 minutes at 80° C. and a fourth period of decreasing temperature to −30° C. in three minutes.

4. A junction structure, comprising a glass article according to claim 1,
    wherein a cable is connected to a connection part of the metal member, and the cable and the electroconductive coating film are connected electrically to each other.

* * * * *